June 29, 1954     W. F. LAUTENSCHLAGER     2,682,090

MOLDING

Filed Oct. 27, 1950

INVENTOR.
WILLIAM F. LAUTENSCHLAGER
BY Zugelter & Zugelter
Attys.

Patented June 29, 1954

2,682,090

UNITED STATES PATENT OFFICE 2,682,090

MOLDING

William F. Lautenschlager, Cincinnati, Ohio, assignor to The Randall Company, Cincinnati, Ohio, a corporation of Ohio Application October 27, 1950, Serial No. 192,465

2 Claims. (Cl. 20—74)

This invention relates to a decorative molding or trim strip for automobile bodies and the like.

An object of this invention is to provide a molding which is easy and inexpensive to manufacture.

A further object is to provide a molding having means whereby fastenings are accurately located on and secured to the molding with a minimum of difficulty during fabrication.

A further object is to provide a molding provided with a groove extending along the major axis of one face thereof for centering the heads of nail type fasteners while the same are being attached to and united with the molding.

The above and other objects and features of the invention will in part be apparent and will in part be obvious from the following detailed description, and the drawing, in which.

In the following detailed description, and the drawing, like reference characters indicate like parts.

Figure 1:
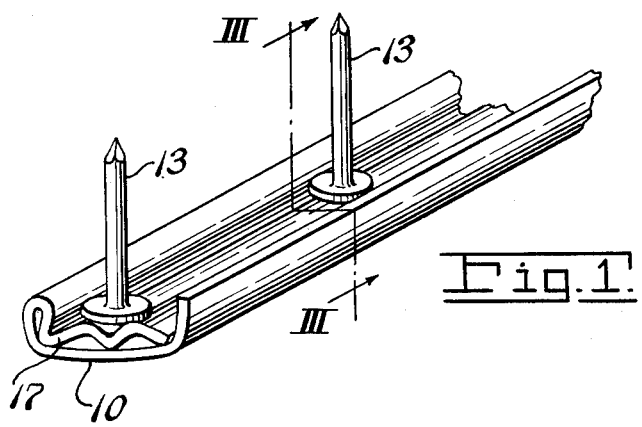
Figure 1 is a view in perspective of a molding strip embodying a form of the invention.
Figures 2, 3:
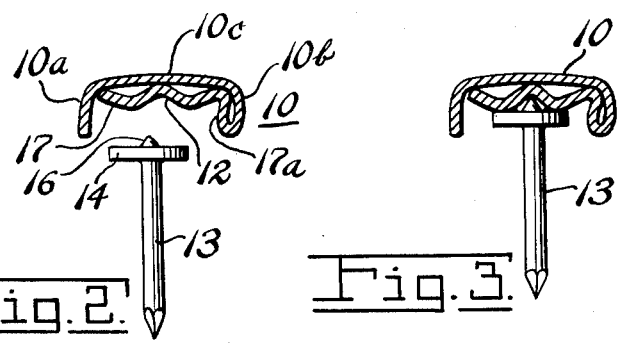
Fig. 2 is an exploded view in section showing the construction of the molding strip and the form of the nail fastener embodied in the finished strip of Fig. 1.
Fig. 3 is a view in section taken on line III—III of Fig. 1.

As shown in Figs. 1, 2 and 3 the molding of this invention includes an elongated metal strip 10 having a groove 12 in one face thereof extending along the major axis of the strip. A plurality of fastening elements such as nails 13, each having a head 14, are disposed in spaced relation along the groove. The head of each nail spans the groove and is provided with a central lug 16 which extends into the groove. As shown in Fig. 3, each nail head is fused to the strip at the location of contact between the head and the metal of the strip bounding sides of the groove and at the area of contact between the lug 16 and sides and bottom of the groove.

In a preferred form of the invention, strip 10 is of channel shape having sides or flanges 10a and 10b, a connecting web 10c, and an auxiliary web 17. Web 17 lies along the inner face of web 10c. Groove 12 is formed in web 17 in the operations by which strip 10 is shaped. As shown, web 17 has a flange 17a that is integral with the top edge of flange 10b. As can be seen in Figs. 2 and 3, the form of web 17 is such that it has line contact with web 10c at the base of the sides of the groove, thereby protecting the dress or exposed face of the strip 10 from the heat developed in the areas of the nail heads when they are welded to web 17.

Figures 4, 5:
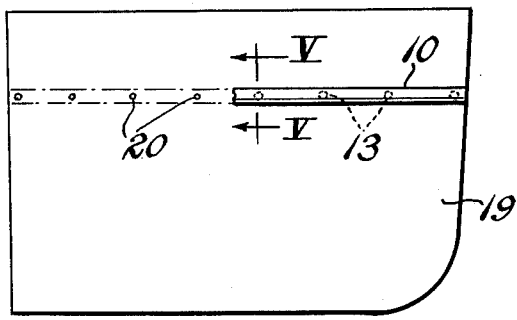
Fig. 4 is a view in side elevation showing a panel of an automobile door with a molding strip secured thereto.
Fig. 5 is a view in section taken on line V—V of Fig. 4.

When the molding is attached as shown in Figs. 4 and 5 to the interior of an automobile body, the auxiliary weld web 17 and the nails are concealed and hidden from view.

As shown in Figs. 3 and 4, the molding is adapted for mounting on a panel 19, such as the door panel of an automobile, in which spaced holes 20 are drilled before the molding is mounted. When the molding is mounted, the nails must be correctly spaced so that each nail enters the proper hole. Each nail is bent over or clinched behind the panel, as shown in Fig. 4 to hold the molding in place.

The lugs on the heads of the nails serve two purposes. Firstly, the lugs form spots at which welding current is concentrated during fabrication of the molding to effectively fuse the nail head to the metal of the strip. Secondly, the lugs serve to center the nails on the strip accurately so that the nails can be properly positioned before welding.

The molding of this invention can quickly and easily be manufactured because the groove in the strip automatically guides the nail heads into proper centered position for welding.

The molding of this invention is subject to structural modification, and the invention is not intended to be limited by the foregoing detailed description and the drawing, except as pointed out in the appended claims.

Having described my invention, what I claim as new and desire to secure by Letters Patent is:

1. A molding which comprises an elongated metal strip having a groove in one face thereof extending along its major axis intermediate the edges thereof, and a plurality of spaced nails the heads of which are disposed cross-wise of said groove and span the same, the heads of said nails being provided with centrally disposed lugs extending into said groove, each of said nail heads being fused to said strip at the location of contact between the head and the metal of the strip bounding the sides of the groove.

2. A molding which comprises an elongated metal strip folded upon itself to provide overlapping parallel upper and lower members, there being an outwardly facing longitudinal groove in one of said members intermediate the edges thereof, the other member overlying the grooved member, there being a space between the members, said overlying member being of channel shape and having flanges embracing the edges of the other member, and a plurality of nails, the heads of which span the groove, each nail head having a centrally disposed lug extending into the groove, the nail heads being fused to the grooved member of the strip, said flanges projecting past the groove and past the heads of the nails.

References Cited in the file of this patent

UNITED STATES PATENTS

| Number | Name | Date |
|---|---|---|
| 677,206 | Hale | June 25, 1901 |
| 1,576,490 | Randall | Mar. 9, 1926 |
| 1,865,660 | Welch | July 5, 1932 |